United States Patent
Ehrnberg

(10) Patent No.: US 12,546,297 B2
(45) Date of Patent: Feb. 10, 2026

(54) FLUID FLOW CONVERTER WITH SUPPORT ARRANGEMENT

(71) Applicant: Enairon AB, Gothenburg (SE)

(72) Inventor: Daniel Ehrnberg, Steninge (SE)

(73) Assignee: ENAIRON AB, Gothenburg (SE)

(*) Notice: Subject to any disclaimer, the term of this patent is extended or adjusted under 35 U.S.C. 154(b) by 0 days.

(21) Appl. No.: 18/851,236

(22) PCT Filed: Apr. 3, 2023

(86) PCT No.: PCT/SE2023/050299
§ 371 (c)(1),
(2) Date: Sep. 26, 2024

(87) PCT Pub. No.: WO2023/195892
PCT Pub. Date: Oct. 12, 2023

(65) Prior Publication Data
US 2025/0198400 A1    Jun. 19, 2025

(30) Foreign Application Priority Data
Apr. 4, 2022  (SE) ..................... 2250430-2

(51) Int. Cl.
*F04B 19/06* (2006.01)
*F03B 17/06* (2006.01)
(Continued)

(52) U.S. Cl.
CPC .............. *F04B 19/06* (2013.01); *F03B 17/06* (2013.01); *F04B 19/12* (2013.01); *F04F 1/06* (2013.01)

(58) Field of Classification Search
CPC ........ F03B 17/06; F03B 17/061; F04B 19/06; F04B 19/12; F05B 2210/18; F05B 2250/15; F05B 2250/25; F04F 1/06
See application file for complete search history.

(56) References Cited

U.S. PATENT DOCUMENTS

| 4,010,647 A | 3/1977 | Kissell et al. |
| 5,275,091 A * | 1/1994 | McFarlane ............. A23B 7/005 |
| | | 99/356 |

(Continued)

FOREIGN PATENT DOCUMENTS

| AT | 501 204 | 7/2006 |
| DE | 10 231 008 | 1/2004 |

(Continued)

OTHER PUBLICATIONS

International Search Report from PCT/SE2023/050299, dated Jun. 1, 2023.

(Continued)

*Primary Examiner* — Jonathan R Matthias
(74) *Attorney, Agent, or Firm* — Westman, Champlin & Koehler, P.A.

(57) ABSTRACT

An apparatus for converting rotation into fluid flow and/or fluid flow into rotation. The apparatus comprises a coiled fluid conduit having an inlet and an outlet, a support arrangement holding the coiled fluid conduit such that the inlet is higher/lower the outlet, a first fluid separator configured to receive batches of first fluid and batches of second fluid output from the outlet of the coiled fluid conduit and separate the first fluid and the second fluid, and an intrastage flow channel connecting the first fluid separator with the inlet of the coiled fluid conduit to allow second fluid separated by the first fluid separator to be transported back towards the inlet of the coiled fluid conduit.

15 Claims, 2 Drawing Sheets

(51) Int. Cl.
*F04B 19/12* (2006.01)
*F04F 1/06* (2006.01)

(56) References Cited

U.S. PATENT DOCUMENTS

| | | | |
|---|---|---|---|
| 5,366,341 A | 11/1994 | Marino | |
| 2006/0174612 A1* | 8/2006 | Buller | F03B 13/00 |
| | | | 60/325 |
| 2018/0119710 A1* | 5/2018 | Ehrnberg | F04F 1/06 |
| 2021/0062833 A1* | 3/2021 | Ehrnberg | F15B 15/02 |

FOREIGN PATENT DOCUMENTS

| | | | |
|---|---|---|---|
| GB | 1 427 723 | 3/1976 | |
| GB | 2 265 185 | 9/1993 | |
| JP | H11201071 A * | 7/1999 | |
| WO | 2016/080902 | 5/2016 | |
| WO | WO-2017077743 A1 * | 5/2017 | ............ F04B 19/12 |
| WO | 2019/151935 | 8/2019 | |

OTHER PUBLICATIONS

Written Opinion Report from PCT/SE2023/050299, dated Jun. 1, 2023.
International Search Report from PCT/SE2023/050301, dated Jun. 1, 2023.
Written Opinion Report from PCT/SE2023/050301, dated Jun. 1, 2023.

* cited by examiner

FLUID FLOW CONVERTER WITH SUPPORT ARRANGEMENT

CROSS-REFERENCE TO RELATED APPLICATION

This Application is a Section 371 National Stage Application of International Application No. PCT/SE2023/050299, filed Apr. 3, 2023 and published as WO/2023/195892, in English on Oct. 12, 2023, which claims priority to Swedish Patent Application No. 2250430-2 filed on Apr. 4, 2022, the contents of which are hereby incorporated by reference in their entirety.

FIELD OF THE INVENTION

The present invention relates to an apparatus for converting rotation to fluid flow, and to an apparatus for converting fluid flow into rotation.

BACKGROUND OF THE INVENTION

It has long been known to pump water or compress air using a device relying on alternatingly admitting air and water into a coiled pipe, which is rotated around an axis of rotation. Such a device has few moving parts, and is considered to be relatively simple and reliable.

For instance, GB 1 427 723 discloses an apparatus for pumping fluids, which comprises a pipe of constant cross-section disposed around a cylindrical structure in a number of turns so as to form a cylindrically shaped coil. One end of the coiled pipe is connected to a hollow shaft of the apparatus, while the other end of the coiled pipe terminates at the periphery of the cylindrical structure and is open to the atmosphere. When the cylindrical structure is rotated, water and air are alternatingly admitted to the open end of the pipe and transported to the hollow shaft.

More energy-efficient apparatuses are disclosed by WO 2016/080902, where, according to embodiments, one coiled fluid conduit—a pressure-increasing fluid conduit—is used to achieve a gradual increase in pressure of first and second fluid, and one coiled fluid conduit—a pressure-decreasing fluid conduit—is used to return first and second fluid, while achieving a gradual decrease in pressure.

There appears to still be room for improvement. In particular, it would be desirable to provide for a more compact and/or energy-efficient apparatus for converting rotation into fluid flow and/or converting fluid flow into rotation.

SUMMARY

In view of the above, it is an object of the present invention to provide for improved conversion of rotation into fluid flow and/or improved conversion of fluid flow into rotation.

According to a first aspect of the present invention, it is therefore provided an apparatus for converting rotation to fluid flow, comprising: at least a first stage including a coiled fluid conduit having an inlet for receiving first fluid having a first density and second fluid having a second density higher than the first density, and an outlet, the coiled fluid conduit being arranged to transport batches of the first fluid and batches of the second fluid towards the outlet of the coiled fluid conduit when the coiled fluid conduit is rotated around a rotational axis, while pressurizing the first fluid and the second fluid to provide a pressure differential between the outlet and the inlet; a support arrangement holding the coiled fluid conduit of the first stage in such a way that a vertical level of a center of a circle formed by the inlet when the coiled fluid conduit is rotated around the rotational axis is higher than a vertical level of a center of a circle formed by the outlet when the coiled fluid conduit is rotated around the rotational axis, by a vertical offset distance selected such that a pressure exerted by a fluid column of second fluid having a height that is equal to the vertical offset distance substantially corresponds in magnitude to the pressure differential between the outlet and the inlet of the coiled fluid conduit of the first stage; and at least a first fluid separator configured to receive the batches of the first fluid and the batches of the second fluid from the outlet of the coiled fluid conduit of the first stage, and separate the first fluid and the second fluid, wherein the first stage further comprises an intrastage flow channel connecting the first fluid separator with the inlet of the coiled fluid conduit of the first stage to allow second fluid separated by the first fluid separator to be transported back towards the inlet of the coiled fluid conduit of the first stage by the pressure differential between the outlet and the inlet of the coiled fluid conduit of the first stage.

A fluid is any substance that flows. Accordingly, fluids include, for example, gases, liquids, and, for instance, solid particles suspended in a liquid to form a particle suspension exhibiting fluid behavior. The first and second fluids may be mutually immiscible. For instance, the first fluid may advantageously be a gas, such as air, and the second fluid may advantageously be a liquid, such as water.

The coiled fluid conduit does not necessarily have to be a coiled tube, but can be configured in many other ways, as long as the fluid path is coiled.

Note that the inlet and/or outlet of the coiled fluid conduit could be placed near or on the axis of rotation. If placed on the axis of rotation the inlet/outlet of the coiled fluid conduit would rotate around a single point which then constitutes a center of a circle formed by the inlet/outlet of the coiled fluid conduit when the coiled fluid conduit is rotated around the rotational axis.

When the coiled fluid conduit is rotated around the rotational axis, against a pressure head, the combined center of mass of the batches of the first fluid and the batches of the second fluid shifts along the coiled fluid conduit corresponding to the gradually increased pressure inside the coiled fluid conduit. The shifted combined center of mass in the coiled fluid conduit will exert a torque on the coiled fluid conduit. A greater or equal torque of opposite sign than this mass center shift induced torque will need to be provided to the coiled fluid conduit to maintain rotation.

To transport first fluid from the inlet of the coiled fluid conduit of the first stage to the outlet thereof, while maintaining closed-circuit operation in respect of second fluid, the present inventor has realized that it would be desirable to arrange the coiled fluid conduit so that there is a vertical offset distance between the inlet level and the outlet level. Hereby, the second fluid can be allowed to flow substantially without resistance back towards the inlet and to convert the energy of the pressure differential between the outlet and the inlet to potential energy of the second fluid that is returned to the inlet. This provides for improved energy efficiency. In addition, as compared to the apparatus in WO 2016/080902, less tubing is needed because the intrastage flow channel can be made using a considerably shorter fluid conduit. In embodiments, the intrastage flow channel may be straight. By using less tubing for the return of second fluid from the outlet to the inlet, the apparatus can also be made considerably more compact, for a given output, at least during transport to the site of installation. The intrastage flow channel of the first stage may connect the first fluid separator of the first stage with the inlet of the coiled fluid conduit of the first stage directly or indirectly, as long as the inlet is configured to also receive first fluid. To receive the first fluid, the inlet of the coiled fluid conduit of the first stage may be arranged in direct contact with a supply of first fluid. In examples where the first fluid is air, the inlet of the coiled fluid conduit of the first stage may be in direct contact with the atmosphere, at least during a first part of a revolution of the coiled fluid conduit of the first stage around the rotational axis of the apparatus. The second fluid may be provided, via the intrastage flow channel of the first stage, to the inlet of the coiled fluid conduit of the first stage substantially continuously, or batch-wise during a second part of the revolution of the coiled fluid conduit of the first stage around the rotational axis of the apparatus, different from the first part of the revolution. In other examples, the inlet of the coiled fluid conduit of the first stage may receive first fluid and second fluid via a second fluid separator, which may be in fluid communication with the inlet of the coiled fluid conduit of the first stage, with the intrastage flow channel, and with an apparatus inlet for receiving first fluid from a supply of first fluid.

For an optimum tradeoff between energy efficiency and design considerations of the apparatus, it has been found to be beneficial to configure the support arrangement to hold the coiled fluid conduit of the first stage in such a way that the rotational axis is tilted by an angle in relation to a horizontal plane being in the range of 35° to 65°. Theoretically, a larger angle would provide for increased energy efficiency, but the inventor has found that the batches of first fluid and second fluid that are necessary to increase the pressure along the coiled fluid conduit are difficult to reliably form and maintain for an angle larger than about 65°.

It should be noted that embodiments of the apparatus according to aspects of the present invention provide for selective return of second fluid from the outlet of a coiled fluid conduit of an apparatus stage (first stage, second stage, etc) towards the inlet of the coiled fluid conduit of the apparatus stage. In other words, substantially only second fluid is returned from the outlet to the inlet of the coiled fluid conduit of the first stage. Selective return should be understood to mean that return of second fluid is prioritized over any return of first fluid. For instance, at least 80% of the total returned volume may be constituted by second fluid. Advantageously, the volume proportion may be above 90%.

According to various embodiments of the first aspect of the present invention, the apparatus may further comprise a second stage including a coiled fluid conduit of the second stage having an inlet for receiving first fluid and second fluid, and an outlet, the coiled fluid conduit of the second stage being arranged to transport batches of the first fluid and batches of the second fluid towards the outlet of the coiled fluid conduit of the second stage when the coiled fluid conduit rotates around the rotational axis, while pressurizing the first fluid and the second fluid; a first fluid separator of the second stage configured to receive the batches of the first fluid and the batches of the second fluid from the outlet of the coiled fluid conduit of the second stage, and separate the first fluid and the second fluid; an intrastage flow channel of the second stage connecting the first fluid separator of the second stage with the inlet of the coiled fluid conduit of the second stage to allow second fluid separated by the first fluid separator of the second stage to be transported back towards the inlet of the coiled fluid conduit of the second stage by the pressure differential between the outlet and the inlet of the coiled fluid conduit of the second stage; and a first interstage flow channel connecting the first fluid separator of the first stage with the inlet of the coiled fluid conduit of the second stage for selectively providing first fluid from the outlet of the coiled fluid conduit of the first stage to the inlet of the coiled fluid conduit of the second stage, so that the first fluid can be brought to a higher pressure by the second stage of the apparatus.

According to a second aspect of the present invention, there is provided an apparatus for converting fluid flow to rotation around a rotational axis, comprising: an apparatus inlet for receiving gaseous pressurized first fluid having a first density; an apparatus outlet for output of depressurized first fluid from the apparatus; at least a first stage including a coiled fluid conduit for accommodating transport of alternating batches of the first fluid and batches of a liquid second fluid having a second density, higher than the first density, from an inlet in fluid communication with the apparatus inlet towards an outlet when the coiled fluid conduit rotates around the rotational axis, while depressurizing the first fluid and the second fluid to provide a pressure differential between the outlet and the inlet; a support arrangement holding the coiled fluid conduit of the first stage in such a way that a vertical level of a center of a circle formed by the inlet when the coiled fluid conduit is rotated around the rotational axis is lower than a vertical level of a center of a circle formed by the outlet when the coiled fluid conduit is rotated around the rotational axis, by a vertical offset distance selected such that a pressure exerted by a fluid column of second fluid having a height that is equal to the vertical offset distance substantially corresponds in magnitude to the pressure differential between the outlet and the inlet of the coiled fluid conduit of the first stage; and at least a first fluid separator of the first stage configured to receive the batches of the first fluid and the batches of the second fluid output from the outlet of the coiled fluid conduit of the first stage, and separate the first fluid and the second fluid, wherein the first stage further comprises an intrastage flow channel of the first stage connecting the first fluid separator of the first stage with the inlet of the coiled fluid conduit of the first stage to allow second fluid separated by the first fluid separator to be transported back towards the inlet of the coiled fluid conduit of the first stage.

According to various embodiments of the second aspect of the present invention, the apparatus may further comprise a second stage including a coiled fluid conduit of the second stage for accommodating transport of alternating batches of the first fluid and batches of the second fluid from an inlet towards an outlet when the coiled fluid conduit rotates around the rotational axis, while depressurizing the first fluid and the second fluid; and a first interstage flow channel connecting the first fluid separator with the inlet of the coiled fluid conduit of the second stage for providing first fluid to the inlet of the coiled fluid conduit of the second stage.

It should be noted that the apparatus for converting rotation to fluid flow according to the first aspect of the present invention and the apparatus for converting fluid flow to rotation may be realized using the same construction. For instance, an apparatus may have two modes of operation-one mode in which the apparatus converts rotation to fluid flow, and one mode in which the apparatus converts fluid flow to rotation. In this case, the direction of rotation in the second mode will be opposite the direction of rotation in the first mode, and an outlet in the first mode will be an inlet in the second mode, etc. Furthermore, in a multi-stage apparatus, the first stage in the first mode will be the last stage in the second mode, and the second stage in the first mode will be the second to last stage in the second mode, etc.

In summary, according to various embodiments the present invention relates to an apparatus for converting rotation into fluid flow and/or fluid flow into rotation. The apparatus comprises a coiled fluid conduit having an inlet and an outlet, a support arrangement holding the coiled fluid conduit such that the inlet is higher the outlet, a first fluid separator configured to receive batches of first fluid and batches of second fluid output from the outlet of the coiled fluid conduit and separate the first fluid and the second fluid, and an intrastage flow channel connecting the first fluid separator with the inlet of the coiled fluid conduit to allow second fluid separated by the first fluid separator to be transported back towards the inlet of the coiled fluid conduit.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the apparatus and method according to the present invention are mainly described with reference to apparatuses for converting rotation into fluid flow and/or converting fluid flow into rotation using air as first fluid and water as second fluid.

It should be noted that this by no means limits the scope of the present invention, which equally well includes, for example, apparatuses operating using other combinations of first and second fluids having different densities. Operation with more than two different fluids is also foreseen.

Furthermore, an example of a multi-stage apparatus is described herein. It should be understood that the enclosed claims also cover a single stage apparatus with an intrastage flow channel allowing second fluid output through the outlet of the coiled fluid conduit to be returned to the inlet of the coiled fluid conduit.

Figure 1:
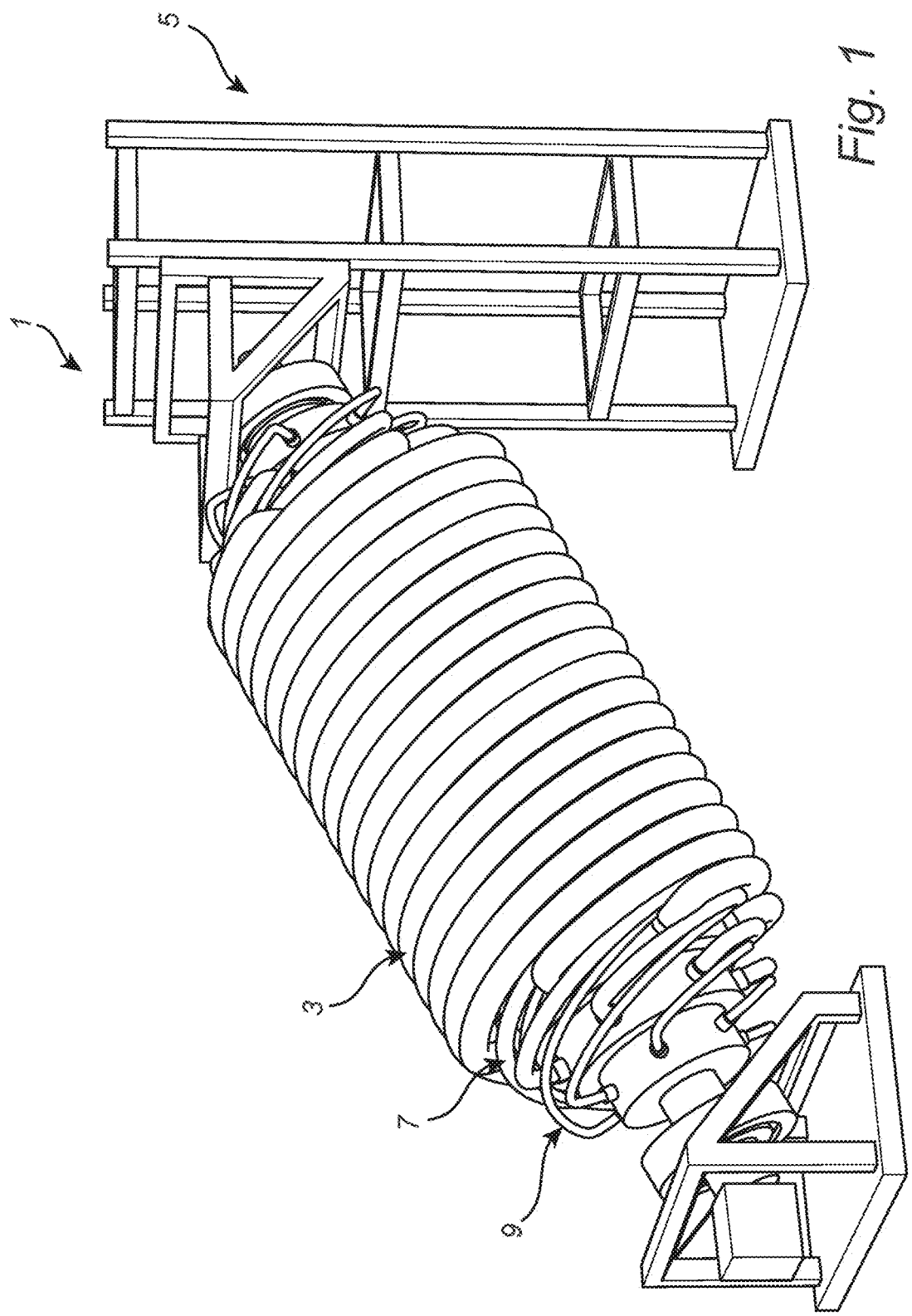
FIG. 1 is a schematic perspective view of an apparatus according to an example embodiment of the present invention, in the form of a multi-stage apparatus having two modes of operation-one mode in which the apparatus converts rotation to fluid flow, and one mode in which the apparatus converts fluid flow to rotation.

FIG. 1 schematically illustrates an apparatus according to an example embodiment of the present invention, in the form of a compressor/air motor 1. The compressor/air motor 1 is an apparatus that can operate in two modes of operation: a first mode in which rotation is converted to fluid (air) flow; and a second mode in which flow of pressurized fluid (air) is converted to rotation.

The above-mentioned first mode of operation will be described in detail herein. The above-mentioned second mode of operation involves running the apparatus "backwards" as compared to the first mode of operation. This means that "inlets" in the first mode will be "outlets" in the second mode, and vice versa. This also means that an electric motor arranged to rotate the apparatus 2 (not shown in FIG. 1) in the first mode of operation may function as an electric generator in the second mode of operation, converting the rotation to electrical power.

The compressor/air motor 1 comprises at least a first stage including a coiled fluid conduit 3 of the first stage and a support arrangement 5 holding the coiled fluid conduit 3 of the first stage so that the inlet of the coiled fluid conduit 3 of the first stage is higher than the outlet of the coiled fluid conduit 3 of the first stage (in the first mode of operation—the "compressor mode"). As was mentioned above, the compressor/air motor 1 in FIG. 1 is a multi-stage apparatus, and is schematically shown as additionally having a second stage including a coiled fluid conduit 7 of the second stage, and a third stage including a coiled fluid conduit 9 of the third stage. In the second mode of operation—the "air motor mode"—the first stage will include the coiled fluid conduit 9 that was in the third stage for the first mode of operation, the second stage will include the coiled fluid conduit 7 that was in the second stage for the first mode of operation, and the third stage will include the coiled fluid conduit 3 that was in the first stage for the first mode of operation. As is schematically shown in FIG. 1, each stage may, in embodiments, actually comprise a plurality of coiled fluid conduits with inlets and outlets, respectively, that are mutually angularly spaced apart. This configuration provides for a more uniform flow over time of first fluid and second fluid.

Figure 2:
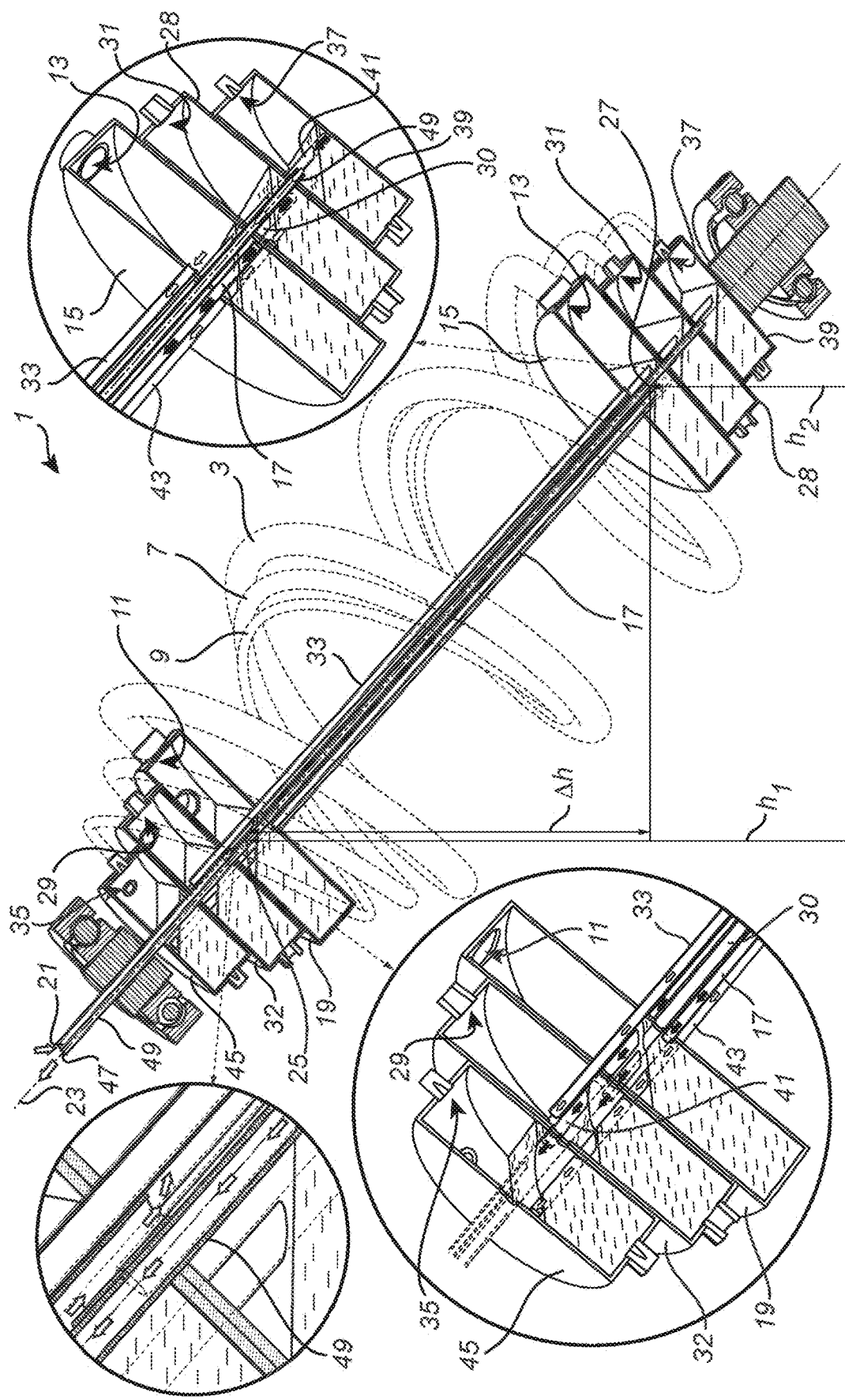
FIG. 2 is a simplified and partly opened schematic illustration of the apparatus in FIG. 1 when operating to convert rotation to fluid flow.

FIG. 2 is a simplified and partly opened schematic illustration of the apparatus 1 in FIG. 1 when operating to convert rotation to fluid flow, in this example as a compressor.

As was mentioned above in connection with FIG. 1, the first stage of the apparatus 1, when operating in the first mode of operation, comprises a coiled fluid conduit 3 of the first stage (only one coiled fluid conduit 3 of the first stage is shown in FIG. 2). The coiled fluid conduit 3 of the first stage has an inlet 11 and an outlet 13, and the apparatus 1 comprises a first fluid separator 15 of the first stage in fluid communication with the outlet 13, and an intrastage flow channel 17 connecting the first fluid separator 15 with the inlet 11 of the coiled fluid conduit 3 of the first stage. In the example configuration of FIG. 2, the intrastage flow channel 17 extends inside a first coil formed by the coiled fluid conduit 3 of the first stage, which provides for a compact apparatus 1.

Furthermore, in the example configuration shown in FIG. 2, the apparatus comprises a second fluid separator 19 of the first stage in fluid communication with the inlet 11 of the coiled fluid conduit 3 of the first stage, with an outlet of the intrastage flow channel 17 of the first stage, and with an apparatus inlet 21 for receiving air from the atmosphere. The provision of the second fluid separator 19 may be beneficial in certain applications, and may facilitate design of a relatively compact apparatus 1. It should, however, be noted that it is possible to design a functioning apparatus 1 without a second fluid separator 19. As an alternative to the provision of a second fluid separator 19, the intrastage flow channel 17 may be directly connected to the coiled fluid conduit 3 of the first stage, either at the inlet 11 thereof, or through a dedicated opening in the coiled fluid conduit 3 of the first stage downstream of the inlet 11.

Moreover, the apparatus inlet 21 need not necessarily be a separate dedicated inlet, but may be constituted by the inlet 11 of the coiled fluid conduit 3 of the first stage.

As can be readily understood, each revolution/coil of the fluid conduit 3 of the first stage (as well as the fluid conduit 7 of the second stage and the fluid conduit 9 of the third stage) is partly filled with gaseous first fluid (air) and partly filled with liquid second fluid (water). In particular, a lower portion of each revolution/coil is filled with second fluid (water). When the apparatus 1 is in operation, batches of first fluid (air) and batches of second fluid (water) are transported towards the outlet 13 of the coiled fluid conduit 3 of the first stage, while pressurizing the first fluid (air) and the second fluid (water) to provide a pressure differential ΔP between the outlet 13 and the inlet 11 of the coiled fluid conduit 3 of the first stage. As is described in detail in WO 2016/080902, which is hereby incorporated by reference in its entirety, the rotation of the coiled fluid conduit 3 of the first stage around a rotational axis 23 results in a vertical position offset of the second fluid (water) in each revolution/coil due to the build-up of pressure in the fluid conduit 3 of the first stage.

The support arrangement 5 (which has been omitted from FIG. 2 to avoid cluttering the drawing) holds the coiled fluid conduit 3 of the first stage in such a way that a first vertical level $h_1$ of a center 25 of a circle formed by the inlet 11 when the coiled fluid conduit 3 is rotated around the rotational axis 23 is higher than a second vertical level $h_2$ of a center 27 of a circle formed by the outlet 13 when the coiled fluid conduit 3 is rotated around the rotational axis 23. The difference—the vertical offset distance Δh—between the first vertical level $h_1$ and the second vertical level $h_2$ is selected such that a pressure exerted by a fluid column of second fluid (water in the exemplary case in FIG. 2) having a height that is equal to the vertical offset distance Δh substantially corresponds in magnitude to the pressure differential ΔP between the outlet 13 and the inlet 11 of the coiled fluid conduit 3 of the first stage. It should be noted that the height of the fluid column of second fluid that is actually present in the intrastage flow channel 17 need not be equal to the vertical offset distance Δh, but may deviate somewhat from the vertical offset distance Δh depending on the exact configuration of the apparatus 1 and/or the properties—such as densities—of the first fluid and second fluid used in the apparatus 1. In the example configuration of the apparatus 1 in FIG. 2, for example, it can be seen that the level of second fluid in the first fluid separator 15 and the above-mentioned center 27 of the circle formed by the outlet 13 when the coiled fluid conduit 3 is rotated around the rotational axis 23 do not exactly coincide. It can also be seen that the level of second fluid in the second fluid separator 19 of the first stage and the above-mentioned center 25 of the circle formed by the inlet 11 when the coiled fluid conduit 3 is rotated around the rotational axis 23 do not exactly coincide. In the example configuration of the apparatus 1 in FIG. 2, the height of the fluid column of second fluid that is actually present in the intrastage flow channel 17 is determined by the height difference between the level of second fluid in the second fluid separator 19 and the level of second fluid in the first fluid separator 15, which differs somewhat from the above-mentioned vertical offset distance Δh. The difference between the height of the actual fluid column and the vertical offset distance Δh will depend on various factors, including the proportion of first fluid and second fluid that is set to be provided as batches to the inlet 11 of the coiled fluid conduit 3 of the first stage, and the inclination of the rotational axis 23. It is expected that this difference may be up to around ±10%. It is thus considered that the vertical offset distance Δh has been selected such that a pressure exerted by a fluid column of second fluid having a height that is equal to the vertical offset distance Δh substantially corresponds in magnitude to, i.e. has a magnitude that is within ±10% of, the pressure differential between the outlet 13 and the inlet 11 of the coiled fluid conduit 3 of the first stage.

The pressure differential ΔP transports the second fluid (in this case water) separated by the first fluid separator 15 of the first stage through the intrastage flow channel 17 of the first stage back towards the inlet 11 of the coiled fluid conduit 3 of the first stage, substantially without any flow resistance exerted by the intrastage flow channel 17. During its passage through the intrastage flow channel 17, the second fluid (water) is depressurized, and the energy of the pressure differential ΔP is converted to an increase in potential energy that is substantially (such as within +10% as explained above) proportional to the vertical offset distance Δh. This configuration provides for an increased energy efficiency of the closed loop return of the second fluid (water) within the first stage of the apparatus 1. Although the closed loop return of second fluid (water) has only been described in detail for the first stage of the apparatus 1, it will be apparent to the skilled person that the same principle applies to the closed loop return of second fluid (water) for additional stages of the apparatus 1 (for a multi-stage apparatus).

In this context it should be mentioned that the fluid column of second fluid in the apparatus 1 and the pressure differential ΔP need not be exactly tuned to each other to achieve an increased energy efficiency in relation to prior art solutions. For instance, the pressure differential ΔP may exceed the counter pressure of the fluid column in the intrastage flow channel 17, so that there is a residual overpressure at the outlet of the intrastage flow channel 17, such as where the intrastage flow channel 17 enters the second fluid separator 19. Alternatively, the pressure differential ΔP may be insufficient to independently transport the second fluid (water) all the way from the first fluid separator 15 to the inlet 11 of the coiled fluid conduit 3 of the first stage. In that case, the apparatus 1 may be provided with an auxiliary flow device, such as a small impeller or the like.

In FIG. 2, the rotational axis 23 is illustrated as being inside the coiled fluid conduit 3 of the first stage, so that the coiled fluid conduit 3 of the first stage is coiled around the rotational axis 23. Although this may provide for a simpler and more compact apparatus 1, it should be noted that the apparatus 1 would be operational also with a rotational axis 23 outside the coiled fluid conduit 3.

In a multi-stage apparatus embodiment such as the apparatus 1 in FIG. 2, the apparatus may advantageously comprise a second stage including the above-mentioned coiled fluid conduit 7 of the second stage (only one coiled fluid conduit 7 of the second stage is shown in FIG. 2). Referring to FIG. 2, this coiled fluid conduit 7 of the second stage has an inlet 29 for receiving first fluid (air) and second fluid (water) and an outlet 31. As described above with reference to the coiled fluid conduit 3 of the first stage, the coiled fluid conduit 7 of the second stage is arranged to transport batches of the first fluid (air) and batches of the second fluid (water) towards the outlet 31, while pressurizing the first fluid (air) and the second fluid (water).

As can be seen in FIG. 2, the multi-stage apparatus 1 further comprises a first fluid separator 28 of the second stage, an intrastage flow channel 30 of the second stage, and a first interstage flow channel 33 connecting the first fluid separator 15 of the first stage with the inlet 29 of the coiled fluid conduit 7 of the second stage for providing pressurized first fluid (air) to the inlet 29 of the coiled fluid conduit 7 of the second stage. In the example configuration of FIG. 2, as was described above for the first stage, the apparatus may further comprise a second fluid separator 32 of the second stage in fluid communication with the inlet 29 of the coiled fluid conduit 7 of the second stage, with an outlet of the intrastage flow channel 30 of the second stage, and with an outlet of the first interstage flow channel 33. As was mentioned above in connection with the description of the first stage, the provision of the second fluid separator 32 of the second stage may be beneficial in certain applications, and may facilitate design of a relatively compact apparatus 1. It should, however, be noted that it is possible to design a functioning apparatus 1 without a second fluid separator 32 of the second stage.

When the apparatus 1 is operated in the first mode of operation, the first interstage flow channel 33, selectively provides pressurized first fluid (air) from the outlet 13 of the coiled fluid conduit 3 of the first stage to the inlet 29 of the coiled fluid conduit 7 of the second stage without further pressure increase.

In the example configuration shown in FIG. 2, the apparatus 1 comprises a third stage including the above-mentioned coiled fluid conduit 9 of the third stage (only one coiled fluid conduit 9 of the third stage is shown in FIG. 2). Referring to FIG. 2, this coiled fluid conduit 9 of the third stage has an inlet 35 for receiving first fluid (air) and second fluid (water) and an outlet 37. As described above with reference to the coiled fluid conduit 3 of the first stage, the coiled fluid conduit 9 of the third stage is arranged to transport batches of the first fluid (air) and batches of the second fluid (water) towards the outlet 37, while pressurizing the first fluid (air) and the second fluid (water).

As can be seen in FIG. 2, the multi-stage apparatus 1 further comprises a first fluid separator 39 of the third stage, an intrastage flow channel 41 of the third stage, and a second interstage flow channel 43 connecting the first fluid separator 28 of the second stage with the inlet 35 of the coiled fluid conduit 9 of the third stage for providing pressurized first fluid (air) to the inlet 35 of the coiled fluid conduit 9 of the third stage. In the example configuration of FIG. 2, as was described above for the first stage, the apparatus may further comprise a second fluid separator 45 of the third stage in fluid communication with the inlet 35 of the coiled fluid conduit 9 of the third stage, with an outlet of the intrastage flow channel 41 of the third stage, and with an outlet of the second interstage flow channel 43. As was mentioned above in connection with the description of the first stage, the provision of the second fluid separator 45 of the third stage may be beneficial in certain applications, and may facilitate design of a relatively compact apparatus 1. It should, however, be noted that it is possible to design a functioning apparatus without a second fluid separator 45 of the third stage.

When the apparatus 1 is operated in the first mode of operation, the second interstage flow channel 43, selectively provides pressurized first fluid (air) from the outlet 31 of the coiled fluid conduit 7 of the second stage to the inlet 35 of the coiled fluid conduit 9 of the third stage without further pressure increase.

Following the pressure increase provided by the coiled fluid conduit 9 of the third stage, as described above for the coiled fluid conduit 3 of the first stage, the pressurized first fluid is made available at an apparatus outlet 47, via a conduit 49 fluid flow connecting the first fluid separator 39 of the third stage with the apparatus outlet 47.

Thus, through the provision of the interstage flow channels, selectively providing pressurized first fluid (air) from the outlet of the coiled fluid conduit of one stage to the inlet of the coiled fluid conduit of the next stage without further pressure increase, the coiled fluid conduits of the different stages of the apparatus can substantially fully overlap, as is schematically illustrated in FIG. 1 and FIG. 2. Hereby a multi-stage machine that is more compact than that described in WO 2016/080902 can be achieved.

In FIG. 2, the intrastage and interstage flow channels are illustrated as straight pipes extending in parallel with the rotational axis 23 of the apparatus 1 inside a first coil formed by the coiled fluid conduit 3 of the first stage, along substantially the full extensions of the intrastage and interstage flow channels. It should be noted that the intrastage and interstage flow channels may be provided in a different configuration. For example, all or some of the intrastage and interstage flow channels may partly extend inside the first coil, and partly outside the first coil, such as inside the first coil for a first portion of a total distance along the intrastage or interstage flow channel and outside the first coil for a second portion of the total distance. For instance, the first interstage flow channel may at least partly extend inside the first coil and partly extend outside. This configuration may facilitate manufacturing and maintenance of the apparatus 1 according to some configurations. Moreover, at least some of the intrastage and/or interstage channels may be coaxial in respect of the rotational axis 23, at least along a portion of a total extension of the intrastage or interstage flow channel. This configuration may provide for a more compact apparatus 1, in particular regarding a dimension in a direction perpendicular to the rotational axis 23.

For a multi-stage apparatus, as is schematically illustrated for the example apparatus in FIG. 1 and FIG. 2, the coiled fluid conduit 7 of the second stage may be radially inside the coiled fluid conduit 3 of the first stage, and the coiled fluid conduit 9 of the third stage may be radially inside the coiled fluid conduit 7 of the second stage, etc. This may facilitate production of the apparatus, since the bigger volumes of air in the first stage benefit from a coiled fluid conduit 3 with a larger internal cross-section.

As is also schematically shown in FIG. 1 and FIG. 2, a distance, along the rotational axis 23, between the inlet 11 and the outlet 13 of the coiled fluid conduit 3 of the first stage may be shorter than the distance, along the rotational axis 23, between the inlet 29 and the outlet 31 of the coiled fluid conduit 7 of the second stage, which may be shorter than the distance, along the rotational axis 23, between the inlet 35 and the outlet 37 of the coiled fluid conduit 9 of the third stage, etc. This may be especially advantageous for embodiments in which the first fluid is a compressible gas, such as the air in the apparatus 1 in FIG. 1 and FIG. 2.

As another measure to optimize the apparatus in FIG. 1 and FIG. 2 to the use of a compressible gas, such as air, as the first fluid, the fluid separator(s) associated with the first stage may have a greater volume than the fluid separator(s) associated with the second stage, which may have a greater volume than the fluid separator(s) associated with the third stage, etc.

When operating in the second mode of operation—the "air motor" mode—pressurized air (or any other suitable gas) is provided at an apparatus inlet of the apparatus 1. Since the apparatus now operates "backwards", as was explained in the beginning of this detailed description, the apparatus inlet in the second mode corresponds to the apparatus outlet 47 in the first mode, etc.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. An apparatus for converting rotation to fluid flow, comprising:
  at least a first stage including a coiled fluid conduit having an inlet for receiving gaseous first fluid having a first density and liquid second fluid having a second density higher than the first density, and an outlet, the coiled fluid conduit being arranged to transport batches of the first fluid and batches of the second fluid towards the outlet of the coiled fluid conduit when the coiled fluid conduit is rotated around a rotational axis, while pressurizing the first fluid and the second fluid to provide a pressure differential between the outlet and the inlet;
  a support arrangement holding the coiled fluid conduit of the first stage in such a way that a vertical level of a center of a circle formed by the inlet when the coiled fluid conduit is rotated around the rotational axis is higher than a vertical level of a center of a circle formed by the outlet when the coiled fluid conduit is rotated around the rotational axis, by a vertical offset distance selected such that a pressure exerted by a fluid column of second fluid having a height that is equal to the vertical offset distance substantially corresponds in magnitude to the pressure differential between the outlet and the inlet of the coiled fluid conduit of the first stage; and
  a first fluid separator of the first stage configured to receive the batches of the first fluid and the batches of the second fluid from the outlet of the coiled fluid conduit of the first stage, and separate the first fluid and the second fluid,
  wherein the first stage further comprises an intrastage flow channel connecting the first fluid separator of the first stage with the inlet of the coiled fluid conduit of the first stage to allow second fluid separated by the first fluid separator of the first stage to be transported back towards the inlet of the coiled fluid conduit of the first stage by the pressure differential between the outlet and the inlet of the coiled fluid conduit of the first stage.

2. The apparatus according to claim 1, wherein the coiled fluid conduit of the first stage is coiled around the rotational axis.

3. The apparatus according to claim 1, wherein the intrastage flow channel of the first stage extends inside a first coil formed by the coiled fluid conduit of the first stage.

4. The apparatus according to claim 1, wherein the apparatus further comprises:
  a second stage including:
    a coiled fluid conduit having an inlet for receiving first fluid and second fluid, and an outlet, the coiled fluid conduit being arranged to transport batches of the first fluid and batches of the second fluid towards the outlet of the coiled fluid conduit when the coiled fluid conduit rotates around the rotational axis, while pressurizing the first fluid and the second fluid;
    a first fluid separator of the second stage configured to receive the batches of the first fluid and the batches of the second fluid from the outlet of the coiled fluid conduit of the second stage, and separate the first fluid and the second fluid; and
    an intrastage flow channel of the second stage connecting the first fluid separator of the second stage with the inlet of the coiled fluid conduit of the second stage to allow second fluid separated by the first fluid separator of the second stage to be transported back towards the inlet of the coiled fluid conduit of the second stage by the pressure differential between the outlet- and the inlet of the coiled fluid conduit of the second stage; and
  a first interstage flow channel connecting the first fluid separator of the first stage with the inlet of the coiled fluid conduit of the second stage for providing first fluid to the inlet of the coiled fluid conduit of the second stage.

5. The apparatus according to claim 4, wherein the first interstage flow channel is configured to provide the first fluid to the inlet of the coiled fluid conduit of the second stage without pressurizing the first fluid.

6. The apparatus according to claim 4 or 5, wherein the first interstage flow channel and the intrastage flow channel of the first stage are coaxial in respect of the rotational axis, at least along a portion of a total extension of the intrastage flow channel of the first stage.

7. The apparatus according to claim 4, wherein the coiled fluid conduit of the second stage is radially inside a first coil formed by the coiled fluid conduit of the first stage in respect of the rotational axis.

8. The apparatus according to claim 4, wherein the apparatus further comprises:
  a third stage including:
    a coiled fluid conduit having an inlet for receiving first fluid and second fluid, and an outlet, the coiled fluid conduit being arranged to transport batches of the first fluid and batches of the second fluid towards the outlet of the coiled fluid conduit when the coiled fluid conduit rotates around the rotational axis, while pressurizing the first fluid and the second fluid;
    a first fluid separator of the third stage configured to receive the batches of the first fluid and the batches of the second fluid from the outlet of the coiled fluid conduit of the second stage, and separate the first fluid and the second fluid; and
    an intrastage flow channel of the third stage connecting the first fluid separator of the third stage with the inlet of the coiled fluid conduit of the third stage to allow second fluid separated by the first fluid separator of the third stage to be transported back towards the inlet of the coiled fluid conduit of the third stage by the pressure differential between the outlet and the inlet of the coiled fluid conduit of the third stage; and
  a second interstage flow channel connecting the first fluid separator of the second stage with the inlet of the coiled fluid conduit of the third stage for providing first fluid to the inlet of the coiled fluid conduit of the third stage,
  wherein:
    each of the coiled fluid conduit of the first stage, the coiled fluid conduit of the second stage, and the coiled fluid conduit of the third stage is coiled around the rotational axis; and
    the second interstage flow channel at least partly extends inside a first coil formed by the coiled fluid conduit of the first stage.

9. The apparatus according to claim 1, the support arrangement holding the coiled fluid conduit of the first stage in such a way that the rotational axis is tilted by an angle in relation to a horizontal plane being in the range of 35° to 65°.

10. The apparatus according to claim 1, comprising a number of stages being in the range 4 or more stages to 7 or fewer stages, wherein:
each stage includes:
a coiled fluid conduit having an inlet for receiving first fluid and second fluid, and an outlet, the coiled fluid conduit being arranged to transport batches of the first fluid and batches of the second fluid towards the outlet of the coiled fluid conduit when the coiled fluid conduit rotates around the rotational axis, while pressurizing the first fluid and the second fluid;
a first fluid separator configured to receive the batches of the first fluid and the batches of the second fluid from the outlet of the coiled fluid conduit, and separate the first fluid and the second fluid; and
an intrastage flow channel connecting the first fluid separator with the inlet of the coiled fluid conduit to allow second fluid separated by the first fluid separator to be transported back towards the inlet of the coiled fluid conduit by the pressure differential between the outlet and the inlet of the coiled fluid conduit;
an interstage flow channel connects the first fluid separator of each stage having a following stage compressing the first fluid to a higher pressure with the inlet of the coiled fluid conduit of the following stage for providing first fluid to the inlet of the coiled fluid conduit of the second stage;
the coiled fluid conduit of each stage is coiled around the rotational axis; and
the rotational axis is tilted by an angle in relation to a horizontal plane being in the range of 35° to 65°.

11. An apparatus for converting fluid flow to rotation around a rotational axis, comprising:
an apparatus inlet for receiving gaseous pressurized first fluid having a first density;
an apparatus outlet for output of depressurized first fluid from the apparatus;
at least a first stage including a coiled fluid conduit for accommodating transport of alternating batches of the first fluid and batches of a liquid second fluid having a second density from an inlet of the coiled fluid conduit of the first stage in fluid communication with the apparatus inlet towards an outlet of the coiled fluid conduit of the first stage when the coiled fluid conduit of the first stage rotates around the rotational axis, while depressurizing the first fluid and the second fluid to provide a pressure differential between the outlet and the inlet of the coiled fluid conduit of the first stage;
a support arrangement holding the coiled fluid conduit of the first stage in such a way that a vertical level of a center of a circle formed by the inlet when the coiled fluid conduit is rotated around the rotational axis is lower than a vertical level of a center of a circle formed by the outlet when the coiled fluid conduit is rotated around the rotational axis, by a vertical offset distance selected such that a pressure exerted by a fluid column of second fluid having a height that is equal to the vertical offset distance substantially corresponds in magnitude to the pressure differential between the outlet and the inlet of the coiled fluid conduit of the first stage; and
a first fluid separator of the first stage configured to receive the batches of the first fluid and the batches of the second fluid from the outlet of the coiled fluid conduit of the first stage, and separate the first fluid and the second fluid,
wherein the first stage further comprises an intrastage flow channel of the first stage connecting the first fluid separator of the first stage with the inlet of the coiled fluid conduit of the first stage to allow second fluid separated by the first fluid separator of the first stage to be transported back towards the inlet of the coiled fluid conduit of the first stage.

12. The apparatus according to claim 11, wherein the coiled fluid conduit of the first stage is coiled around the rotational axis.

13. The apparatus according to claim 11, wherein the intrastage flow channel of the first stage extends inside a first coil formed by the coiled fluid conduit of the first stage.

14. The apparatus according to claim 11, wherein the apparatus further comprises:
a second stage including a coiled fluid conduit for accommodating transport of alternating batches of the first fluid and batches of the second fluid from an inlet of the coiled fluid conduit of the second stage towards an outlet of the coiled fluid conduit of the second stage when the coiled fluid conduit of the second stage rotates around the rotational axis, while depressurizing the first fluid and the second fluid;
a first fluid separator of the second stage configured to receive the batches of the first fluid and the batches of the second fluid from the outlet of the coiled fluid conduit of the second stage, and separate the first fluid and the second fluid;
an intrastage flow channel of the second stage connecting the first fluid separator of the second stage with the inlet of the coiled fluid conduit of the second stage to allow second fluid separated by the first fluid separator of the second stage to be transported back towards the inlet of the coiled fluid conduit of the second stage; and
a first interstage flow channel connecting the first fluid separator of the first stage with the inlet of the coiled fluid conduit of the second stage for providing first fluid to the inlet of the coiled fluid conduit of the second stage.

15. The apparatus according to claim 14, wherein:
each of the coiled fluid conduit of the first stage and the coiled fluid conduit of the second stage is coiled around the rotational axis; and
the first interstage flow channel extends inside a first coil formed by the coiled fluid conduit of the first stage and inside a second coil formed by the coiled fluid conduit of the second stage.

* * * * *